(12) United States Patent
Schulz et al.

(10) Patent No.: US 10,828,872 B2
(45) Date of Patent: Nov. 10, 2020

(54) COMPOSITE PANE HAVING ELECTRICALLY CONDUCTIVE COATING FOR A HEAD-UP DISPLAY

(71) Applicant: Saint-Gobain Glass France, Courbevoie (FR)

(72) Inventors: Valentin Schulz, Niederzier (DE); Guenther Schall, Kreuzau (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 210 days.

(21) Appl. No.: 16/066,056

(22) PCT Filed: Mar. 1, 2017

(86) PCT No.: PCT/EP2017/054735
§ 371 (c)(1),
(2) Date: Jun. 25, 2018

(87) PCT Pub. No.: WO2017/157660
PCT Pub. Date: Sep. 21, 2017

(65) Prior Publication Data
US 2019/0329529 A1    Oct. 31, 2019

(30) Foreign Application Priority Data
Mar. 17, 2016  (EP) .................................... 16160839

(51) Int. Cl.
*B32B 17/10* (2006.01)
*G02B 27/01* (2006.01)

(52) U.S. Cl.
CPC .. *B32B 17/10036* (2013.01); *B32B 17/10568* (2013.01); *G02B 27/0101* (2013.01); *G02B 2027/011* (2013.01)

(58) Field of Classification Search
None
See application file for complete search history.

(56) References Cited

U.S. PATENT DOCUMENTS 5,013,134 A * 5/1991 Smith .............. B32B 17/10568
  345/7
5,091,258 A * 2/1992 Moran .............. B32B 17/10174
  428/437

(Continued)

FOREIGN PATENT DOCUMENTS

CA  2076420 C  7/1999
CN  104582956 A  4/2015

(Continued)

OTHER PUBLICATIONS

Aclocque, J.P., "Double Vision as a Disturbing Optical Failure of the Windshield", Z. Glastechn. Ber., vol. 43, Issue 5, pp. 193-198, 16 pages, (May 1970), (English translation + German original).

(Continued)

*Primary Examiner* — Jennifer D. Carruth
(74) *Attorney, Agent, or Firm* — Pillsbury Winthrop Shaw Pittman LLP (57) ABSTRACT

A composite pane for a head-up display is described. The composite pane has an upper edge and a lower edge, at least including an outer pane and an inner pane. The outer pane and the inner pane are joined to one another via a thermoplastic intermediate layer. A transparent, electrically conductive coating on the surface of the inner pane faces the intermediate layer. The thickness of the intermediate layer is variable at least in sections in the vertical course between the lower edge and the upper edge. The inner pane has a thickness less than 1.6 mm, the outer pane has a thickness of 2.1 mm to 4.5 mm, and the total thickness (d) of the composite pane is at least 4.4 mm.

25 Claims, 2 Drawing Sheets

(56) References Cited

U.S. PATENT DOCUMENTS

| | | | |
|---|---|---|---|
| 5,130,174 | A | 7/1992 | Esposito |
| 5,504,622 | A | 4/1996 | Oikawa et al. |
| 5,812,332 | A * | 9/1998 | Freeman ............... B32B 3/02 |
| | | | 359/894 |
| 5,945,199 | A * | 8/1999 | Morin ............ B32B 17/10018 |
| | | | 345/7 |
| 8,075,983 | B2 | 12/2011 | Masaki et al. |
| 8,764,923 | B2 | 7/2014 | Durbin et al. |
| 9,067,386 | B2 | 6/2015 | Miyai |
| 9,915,822 | B2 | 3/2018 | Arndt et al. |
| 10,234,681 | B2 | 3/2019 | Arndt et al. |
| 10,350,859 | B2 | 7/2019 | Arndt et al. |
| 2002/0086141 | A1 | 7/2002 | Sauer |
| 2004/0109251 | A1 | 6/2004 | Freeman et al. |
| 2004/0166288 | A1 | 8/2004 | Travis et al. |
| 2005/0142332 | A1 | 6/2005 | Sauer |
| 2006/0210776 | A1 | 9/2006 | Lu et al. |
| 2007/0009714 | A1 * | 1/2007 | Lee ................... B32B 2367/00 |
| | | | 428/172 |
| 2007/0020465 | A1 | 1/2007 | Thiel et al. |
| 2007/0082219 | A1 | 4/2007 | Fleury et al. |
| 2007/0148472 | A1 * | 6/2007 | Masaki ........... B32B 17/10036 |
| | | | 428/426 |
| 2008/0176043 | A1 * | 7/2008 | Masaki ........... B32B 17/10036 |
| | | | 428/172 |
| 2009/0294212 | A1 | 12/2009 | Miyai |
| 2010/0314900 | A1 | 12/2010 | Labrot et al. |
| 2011/0189426 | A1 | 8/2011 | Durbin et al. |
| 2012/0025559 | A1 | 2/2012 | Offermann et al. |
| 2012/0094084 | A1 | 4/2012 | Fisher et al. |
| 2013/0149503 | A1 | 6/2013 | Yamamoto et al. |
| 2013/0188260 | A1 | 7/2013 | Matsushita et al. |
| 2013/0249942 | A1 | 9/2013 | Green et al. |
| 2013/0316158 | A1 | 11/2013 | Rehfeld et al. |
| 2014/0011000 | A1 | 1/2014 | Dunkmann et al. |
| 2014/0319116 | A1 | 10/2014 | Fischer et al. |
| 2014/0354692 | A1 | 12/2014 | Ng-Thow-Hing et al. |
| 2014/0362434 | A1 | 12/2014 | Schmitz et al. |
| 2014/0375816 | A1 | 12/2014 | Maihoefer |
| 2015/0323716 | A1 | 11/2015 | Greb et al. |
| 2016/0291324 | A1 * | 10/2016 | Arndt ............... B32B 17/10568 |
| 2016/0320616 | A1 | 11/2016 | Ichii |
| 2016/0347036 | A1 * | 12/2016 | Mellor ............ B32B 17/10036 |
| 2017/0003503 | A1 | 1/2017 | Arndt et al. |
| 2017/0274630 | A1 | 9/2017 | Oota et al. |
| 2017/0313032 | A1 | 11/2017 | Arndt et al. |
| 2017/0334172 | A1 * | 11/2017 | Keller ..................... B32B 17/10 |
| 2018/0149865 | A1 | 5/2018 | Arndt et al. |
| 2018/0149867 | A1 | 5/2018 | Kremers et al. |
| 2018/0157033 | A1 | 6/2018 | Arndt et al. |
| 2018/0297331 | A1 | 10/2018 | Gahagan |
| 2019/0285882 | A1 * | 9/2019 | Arndt ..................... G02B 27/01 |
| 2020/0147935 | A1 * | 5/2020 | Patrickson .......... B32B 17/1011 |

FOREIGN PATENT DOCUMENTS

| | | |
|---|---|---|
| DE | 102007059323 A1 | 6/2009 |
| DE | 102008008758 A1 | 8/2009 |
| DE | 102013012648 A1 | 3/2014 |
| DE | 102014001710 A1 | 8/2014 |
| DE | 102014005977 A1 | 9/2014 |
| EP | 1800855 A1 | 6/2007 |
| EP | 1880243 A2 | 1/2008 |
| EP | 1800855 B1 | 2/2013 |
| FR | 2680584 A1 | 2/1993 |
| JP | S58-09132 U | 1/1983 |
| JP | H03209210 A | 9/1991 |
| JP | 2004536009 A | 12/2004 |
| JP | 2008201667 A | 9/2008 |
| JP | 2009035444 A | 2/2009 |
| JP | 2011207645 A | 10/2011 |
| JP | 2013001613 A | 1/2013 |
| JP | 2013-525235 A | 6/2013 |
| JP | 2017502124 A | 1/2017 |
| JP | 2018-531203 A | 10/2018 |
| KR | 0135743 B1 | 4/1998 |
| KR | 20100094987 A | 8/2010 |
| WO | 03/024155 A2 | 3/2003 |
| WO | 2006/122305 A2 | 11/2006 |
| WO | 2009/071135 A1 | 6/2009 |
| WO | 2010/121986 A1 | 10/2010 |
| WO | 2012/029916 A1 | 3/2012 |
| WO | 2012/073030 A1 | 6/2012 |
| WO | 2013/104438 A1 | 7/2013 |
| WO | 2013/104439 A1 | 7/2013 |
| WO | 2013/136374 A1 | 9/2013 |
| WO | 2014/079567 A1 | 5/2014 |
| WO | WO 2014/126251 A1 | 8/2014 |
| WO | 2015/086233 A1 | 6/2015 |
| WO | 2015/086234 A1 | 6/2015 |
| WO | WO 2015/079158 A1 | 6/2015 |
| WO | 2015/134836 A1 | 9/2015 |
| WO | WO 2015/170771 A1 | 11/2015 |
| WO | 2016/091435 A1 | 6/2016 |
| WO | 2016/198678 A1 | 12/2016 |
| WO | 2016/198679 A1 | 12/2016 |
| WO | WO 2017/099166 A1 | 6/2017 |

OTHER PUBLICATIONS

Non-Final Office Action for U.S. Appl. No. 15/038,321, filed May 20, 2016 on behalf of Saint-Gobain Glass France. dated May 9, 2017. 10 pages.

Notice of Allowance for U.S. Appl. No. 15/038,321, filed May 20, 2016 on behalf of Saint-Gobain Glass France. dated Aug. 28, 2017. 7 pages.

Notice of Allowance for U.S. Appl. No. 15/038,321, filed May 20, 2016 on behalf of Saint-Gobain Glass France. dated Nov. 9, 2017. 7 pages.

Non-Final Office Action for U.S. Appl. No. 15/881,576, filed Jan. 26, 2018 on behalf of Saint-Gobain Glass France. dated Mar. 28, 2018. 5 pages.

Non-Final Office Action for U.S. Appl. No. 15/039,794, filed May 26, 2016 on behalf of Saint-Gobain Glass France. dated Feb. 22, 2018. 27 pages.

Restriction Requirement for U.S. Appl. No. 15/531,718, filed May 30, 2017 on behalf of Saint-Gobain Glass France. dated May 21, 2018. 8 pages.

International Search Report for International application PCT/EP2017/054735 filed Mar. 1, 2017 on behalf of Saint-Gobain Glass France. dated May 24, 2017. 9 pages. (German Original + English Translation).

International Search Report for International application PCT/EP2014/074115 filed Nov. 10, 2014 on behalf of Saint-Gobain Glass France. dated Jan. 21, 2015. 5 pages. (German Original + English Translation).

Written Opinion for International application PCT/EP2014/074115 filed Nov. 10, 2014 on behalf of Saint-Gobain Glass France. dated Jan. 21, 2015. 14 pages. (German Original + English Translation).

International Search Report for International application PCT/EP2014/074116 filed Nov. 10, 2014 on behalf of Saint-Gobain Glass France. dated Jan. 21, 2015. 5 pages. (German Original + English Translation).

Written Opinion for International application PCT/EP2014/074116 filed Nov. 10, 2014 on behalf of Saint-Gobain Glass France. dated Jan. 21, 2015. 17 pages. (German Original + English Translation).

International Search Report for International application PCT/EP2015/073625 filed Oct. 13, 2015 on behalf of Saint-Gobain Glass France. dated Dec. 9, 2015.7 pages. (German Original + English Translation).

Written Opinion for International application PCT/EP2015/073625 filed Oct. 13, 2015 on behalf of Saint-Gobain Glass France. dated Dec. 9, 2015. 11 pages. (German Original + English Translation).

International Search Report for International application PCT/EP2016/063406 filed Jun. 10, 2016 on behalf of Saint-Gobain Glass France. dated Sep. 21, 2016. 7 pages. (German Original + English Translation).

(56) References Cited

OTHER PUBLICATIONS

Written Opinion for International application PCT/EP2016/063406 filed Jun. 10, 2016 on behalf of Saint-Gobain Glass France. dated Sep. 21, 2016. 13 pages. (German Original + English Translation).
International Search Report for International application PCT/EP2016/063407 filed Jun. 10, 2016 on behalf of Saint-Gobain Glass France. dated Sep. 21, 2016. 7 pages. (German Original + English Translation).
Written Opinion for International application PCT/EP2016/063407 filed Jun. 10, 2016 on behalf of Saint-Gobain Glass France. dated Sep. 21, 2016. 13 pages. (German Original + English Translation).
Non-Final Office Action for U.S. Appl. No. 15/578,213, filed Nov. 29, 2017 on behalf of Saint-Gobain Glass France. dated Oct. 9, 2019. 26 Pages.
Final Office Action for U.S. Appl. No. 15/039,794, filed May 26, 2016, on behalf of Saint-Gobain Glass France. dated Dec. 12, 2018. 31 pages.
Non-Final Office Action for U.S. Appl. No. 15/531,718, filed May 30, 2017 on behalf of Saint-Gobain Glass France. dated Jul. 23, 2018. 9 pages.
Notice of Allowance for U.S. Appl. No. 15/531,718, filed May 30, 2017, on behalf of Saint-Gobain Glass France. dated Jan. 10, 2019. 11 pages.
Notice of Allowance for U.S. Appl. No. 15/881,576, filed Jan. 26, 2018, on behalf of Saint-Gobain Glass France. dated Nov. 6, 2018. 9 pages.
Notice of Allowance for U.S. Appl. No. 15/881,576, filed Jan. 26, 2018 on behalf of Saint-Gobain Glass France. dated Sep. 12, 2018. 9 pages.
Written Opinion of International Application No. PCT/EP2017/054735 filed Mar. 1, 2017 on behalf of Saint-Gobain Glass France. dated May 24, 2017. 12 pages. (German original + English translation).
First Office Action as issued in Chinese Patent Application No. 201780000613.7, dated May 29, 2020.

\* cited by examiner

| Applying a conductive coating 6 to a surface III of an inner pane 2 with a thickness less than 1.6 mm |
| --- |
| Arranging a wedge-shaped intermediate layer 3 on the coating 6 |
| Arranging an outer pane 1 on the intermediate layer 3, wherein the outer pane 1 is selected such that the total thickness d of the stack is at least 4.0 mm |
| Laminating the outer pane 1, the intermediate layer 3, and the inner pane 2 to form a composite pane 10 |

Fig. 4

COMPOSITE PANE HAVING ELECTRICALLY CONDUCTIVE COATING FOR A HEAD-UP DISPLAY

CROSS REFERENCE TO RELATED APPLICATIONS

The present application is the U.S. national stage of International Patent Application PCT/EP2017/054735 filed internationally on Mar. 1, 2017, which, in turn, claims priority to European Patent Applications No. EP 16160839.3 filed on Mar. 17, 2016.

The invention relates to a composite pane and a projection arrangement for a head-up display, a method for producing the composite pane, and use thereof.

Modern automobiles are increasingly equipped with so-called head-up displays (HUDs). With a projector, for example, in the region of the dashboard or in the roof region, images are projected onto the windshield, reflected there, and perceived by the driver as a virtual image (from his point of view) behind the windshield. Thus, important data can be projected into the driver's field of vision, for example, the current driving speed, navigation or warning messages, which the driver can perceive without having to divert his glance from the road. Head-up displays can thus contribute significantly to an increase in traffic safety.

With the above described head-up displays, the problem arises that the projector image is reflected on both surfaces of the windshield. Thus, the driver perceives not only the desired primary image, which is caused by the reflection on the interior-side surface of the windshield (primary reflection). The driver also perceives a slightly offset secondary image, usually weaker in intensity, which is caused by the reflection on the exterior-side surface of the windshield (secondary reflection). The latter is commonly referred to as a ghost image ("ghost"). This problem is commonly resolved in that the reflecting surfaces are arranged at an angle relative to one another deliberately selected such that the primary image and the ghost image coincide, as a result of which the ghost image is no longer distractingly noticeable.

Windshields comprise two glass panes that are laminated to one another via a thermoplastic film. If the surfaces of the glass panes are to be arranged at an angle as described, it is customary to use a thermoplastic film with a non-constant thickness. This is also referred to as a wedge-shaped film or a wedge film. The angle between the two surfaces of the film is referred to as a wedge angle. The wedge angle can be constant over the entire film (linear change in thickness) or change as a function of position (nonlinear change in thickness). Composite glasses with wedge films are known, for example, from WO2009/071135A1, EP1800855B1, or EP1880243A2.

It is also known to provide windshields with transparent, electrically conductive coatings. These coatings can act as IR-reflecting coatings to reduce the heating up of the vehicle interior and thus improve thermal comfort. The coatings can, however, also be used as heatable coatings by connecting them to a voltage source such that a current flows through the coating. Suitable coatings include conductive, metallic layers based on silver. Since these coatings are susceptible to corrosion, it is customary to apply them on the surface of the outer pane or the inner pane facing the intermediate layer such that they have no contact with the atmosphere. Silver-containing transparent coatings are known, for example, from WO 03/024155, US 2007/0082219 A1, US 2007/0020465 A1, WO 2013/104438, or WO 2013/104439.

Windshields with conductive coatings in the interior of the composite glass have, in connection with head-up displays, the problem that an additional reflecting boundary surface for the projector image is formed by the conductive coating. This results in another undesirable secondary image, which is also referred to as a layer ghost image or a layer ghost.

DE102014005977 discloses a HUD projection arrangement with a coated windshield. To avoid the layer ghost, it is proposed to filter near IR radiation components out of the projector image in order to reduce the reflection on the coating. However, the solution has the disadvantage that the projector must be modified accordingly. Also, the entire visible spectrum is no longer available for the generation of the display image.

The object of the invention is to provide a composite pane for a head-up display that is provided with an electrically conductive coating, wherein the occurrence of the ghost image generated by the coating is effectively avoided.

The object of the present invention is accomplished according to the invention by a composite pane in accordance with the disclosure. Preferred embodiments are also disclosed.

The composite pane for a head-up display (HUD) according to the invention has an upper edge and a lower edge. The term "upper edge" refers to the side edge of the composite pane that is intended to point upward in the installation position. The term "lower edge" refers to the side edge that is intended to point downward in the installation position. When the composite pane is the windshield of a motor vehicle, the upper edge is frequently referred to as the "roof edge" and the lower edge as the "engine edge".

The composite pane according to the invention comprises an outer pane and an inner pane that are joined to one another via a thermoplastic intermediate layer. The composite pane is intended, in an opening, in particular a window opening of a motor vehicle, to separate the interior from the outside environment. In the context of the invention, the term "inner pane" refers to the pane facing the interior (vehicle interior). The term "outer pane" refers to the pane facing the outside environment.

The thickness of the intermediate layer is variable, at least in sections, in the vertical course between the lower edge and the upper edge of the composite pane. Here, "in sections" means that the vertical course between the lower edge and the upper edge has at least one section in which the thickness of the intermediate layer varies depending on position. However, the thickness can also vary in a plurality of sections or in the entire vertical course. The term "vertical course" refers to the course between the lower edge and the upper edge with the direction of the course being substantially perpendicular to said edges. An intermediate layer with variable thickness is typically referred to as a "wedge film". The angle between the two surfaces of the intermediate layer is referred to as a "wedge angle". If the wedge angle is not constant, the tangents to the surfaces must be used for its measurement at a point.

When a projector is aimed at the composite pane to generate a display image of the HUD, the desired virtual image is generated by reflection on the interior-side surface of the inner pane facing away from the intermediate layer. The part of the beam not reflected passes through the composite pane and is reflected once again on the exterior-side surface of the outer pane facing away from the intermediate layer. Thus, an undesirable second virtual image, the so-called ghost image or "ghost" is generated. In the case of parallel pane surfaces, the image and the ghost image would appear offset relative to one another, which is bothersome for the viewer. By means of the wedge angle, the ghost image substantially coincides spatially with the image such that the viewer still perceives only a single image.

The composite pane has, according to the invention, a transparent, electrically conductive coating on the surface of the inner pane facing the intermediate layer. By means of the coating, another boundary surface with a significant change in the refractive index is produced, i.e., another reflecting boundary surface for the light beam of the HUD projector. The coating thus generates another undesirable ghost image, the so-called "layer ghost image" or "layer ghost".

In principle, the layer ghost image—like the ordinary ghost image—could be avoided by a wedge-shaped arrangement of the reflecting surfaces. However, for this, the inner pane would have to be wedge-shaped, which, in particular in the case of glass panes that are common for composite panes in the automobile industry, would be technically very complicated to accomplish.

According to the invention, the inner pane has a thickness less than 1.6 mm. The inventors found that with such low thicknesses for the inner pane, the spatial offset between the image and the layer ghost image becomes small enough to not have a bothersome effect. This is true in particular for image distances of at least 1.5 m. The term "image distance" means the distance from the viewer (so-called "eye position") to the virtual image. The effect is based on the typical angular acuity of the human eye: with the image distance indicated, the thin inner pane according to the invention results in an offset between the primary image and the layer ghost image of less than one arcminute, too small for the human eye to resolve.

The use of thin glass panes for composite panes is, however, in principle, accompanied by a worsening of acoustic properties, in other words, shielding against ambient noises, and of mechanical properties, in particular the stiffness of the composite pane.

This is compensated according to the invention by the use of a thicker outer pane such that the total thickness of the composite pane is at least 4.0 mm, preferably at least 4.4 mm. The inventors found that with such a composite pane the bothersome occurrence of the layer ghost image can be avoided and the necessary acoustic and mechanical characteristics can be ensured.

Due to the wedge angles according to the invention, the thickness of the composite pane is not constant. In the context of the invention, the total thickness is measured on the thinnest side edge, i.e., typically, on the lower edge of the composite pane. The total thickness is thus the minimum total thickness occurring.

The invention also includes a projection arrangement for a head-up display, at least comprising a composite pane according to the invention and a projector that is aimed at a region of the composite pane, with the thickness of the intermediate layer being variable at least in this region. The projector illuminates the composite pane via the interior-side surface of the inner pane, which forms the primary reflection plane for generating the display image (primary reflection).

The region of the composite pane that is intended to be illuminated by the projector in order to generate the HUD display image is also referred to as the "HUD region" of the composite pane. The thickness of the intermediate layer is preferably variable, at least in the HUD region, in particular at least in the entire HUD region, in order to effectively prevent ghost images. However, the section with variable thickness can also be larger than the HUD region.

The composite pane according to the invention is, in a preferred application, a motor vehicle windshield, in particular the windshield of a passenger car or a truck.

The term "transparent coating" means a coating that has average transmittance in the visible spectral range of at least 80%, which thus does not substantially restrict vision through the pane.

Preferably, at least 80% of the pane surface is provided with the coating according to the invention. In particular, the coating is applied on the entire surface of the pane with the exception of a peripheral edge region and, optionally, a local region that is intended to ensure the transmission of electromagnetic radiation through the composite pane as communication windows, sensor windows, or camera windows, and, consequently, are not provided with the coating. The peripheral uncoated edge region has, for example, a width of up to 20 cm. It prevents direct contact of the coating with the surrounding atmosphere such that the coating is protected, inside the composite pane, against corrosion and damage.

The electrically conductive coating can be a single layer or a multilayer system. The coating includes at least one electrically conductive layer. Typically, the coating includes additional, dielectric layers, which, as antireflection layers, blocker layers, or surface adaptation layers, optimize the optical, electrical, and/or mechanical properties of the coating.

The at least one electrically conductive layer can include a metal, a metal alloy, or a transparent conductive oxide (TCO), for example, indium tin oxide (ITO). In a preferred embodiment, the at least one electrically conductive layer contains silver. The silver content of the layer is preferably greater than 50%, particularly preferably greater than 90%. The layer is most particularly preferably substantially made of silver, apart from any impurities or dopants.

The conductive coating can preferably include a plurality of electrically conductive layers that are separated from one another by dielectric layers. Through the splitting of the conductive materials into a plurality of thin layers, high electrical conductivity can be achieved along with high optical transmittance. The coating preferably includes at least two, particularly preferably two or three, conductive layers, in particular silver-containing layers.

Typical materials that are commonly used for the dielectric layers of the conductive coating are, for example, silicon nitride, silicon oxide, zinc oxide, tin zinc oxide, and aluminum nitride.

The electrically conductive coating according to the invention can be an IR-reflecting coating and serve as a solar protection coating to prevent the heating up of the interior bounded by the composite pane by the IR component of sunlight. The coating can also be heatable. To that end, the coating is connected to a voltage source, typically via so-called busbars, such that a current flows across the coating which heats up as a result, providing the heating function.

The coating is typically a thin-film stack. Typical thicknesses of the coating are less than 1 µm. Typical thicknesses of the conductive layers are in the range from 5 nm to 50 nm for silver-containing layers and 50 nm to 500 nm for TCO-containing layers.

The total thickness of the composite pane is, in an advantageous embodiment, from 4.0 mm to 6.0 mm, preferably from 4.4 mm to 6.0 mm, particularly preferably from 4.4 mm to 5.5 mm. Composite panes with these thicknesses have sufficient mechanical stability and strength and advantageous acoustic properties in terms of shielding against ambient noises. However, they are, on the other hand, also not too thick and heavy to be used as a windshield of typical vehicles, in particular motor vehicles.

The outer pane and the inner pane preferably have a constant thickness with substantially plane-parallel primary surfaces and a peripheral side edge connecting them.

The thickness of the inner pane is, in an advantageous embodiment, from 0.4 mm to 1.5 mm, preferably from 0.7 mm to 1.1 mm. In this range, the bothersome occurrence of the layer ghost image can be particularly effectively avoided by virtual coincidence of the primary reflection and the layer ghost image.

The thickness of the outer pane is, in an advantageous embodiment, at least 2.1 mm, preferably at least 2.5 mm. The thickness of the outer pane is preferably 4.5 mm at most, preferably 3.5 mm at most. The thickness of the outer pane is, in a particularly advantageous embodiment, from 2.1 mm to 4.5 mm, for example, from 2.1 mm to 3.5 mm or from 2.5 to 4.5 mm, preferably from 2.5 mm to 3.5 mm. In in this range, the composite pane has advantageous mechanical stability and noise-shielding properties, but is nevertheless still thin and light enough to be able to be used as a windshield.

The outer pane and the inner pane are preferably made of glass, in particular of soda lime glass, which is customary for windowpanes. The panes can, however, in principle, also be made of other types of glass (for example, borosilicate glass, quartz glass, or aluminosilicate glass) or transparent plastics (for example, polymethylmethacrylate or polycarbonate).

The outer pane and the inner panes can, independently of one another, be non-prestressed, partially prestressed, or prestressed. If at least one of the panes is to be prestressed, this can be thermal or chemical prestressing.

In a preferred embodiment, the outer pane and inner pane are not prestressed. However, during the lamination of the panes, a characteristic distribution of tensile and compressive stresses develops, which the person skilled in the art can distinguish from stresses that are deliberately created by the use of prestressed panes.

The outer pane, the inner pane, and the thermoplastic intermediate layer can be clear and colorless, but also tinted or colored. The total transmittance through the composite pane is, in a preferred embodiment, greater than 70%, in particular when the composite pane is a windshield. The term "total transmittance" is based on the process for testing the light permeability of motor vehicle windows specified by ECE-R 43, Annex 3, § 9.1.

The composite pane is preferably curved in one or a plurality of spatial directions, as is customary for motor vehicle windowpanes, wherein typical radii of curvature are in the range from approx. 10 cm to approx. 40 m. The composite pane can, however, also be flat, for example, when it is intended as a pane for buses, trains, or tractors.

The wedge angle of the intermediate layer can be constant in the vertical course, resulting in a linear variation in thickness of the intermediate layer, with the thickness typically becoming greater from the bottom upward. The directional indication "from the bottom upward" refers to the direction from the lower edge to the upper edge, i.e, the vertical course. However, there can be more complex thickness profiles, in which the wedge angle is variable, linearly or non-linearly, from the bottom upward (in other words, dependent on position in the vertical course).

Preferably, the thickness of the intermediate layer increases from the bottom upward at least in sections in the vertical course.

The variable thickness of the intermediate layer can be limited to one section of the vertical course. This section preferably corresponds at least to the so-called HUD region of the composite pane, i.e., the region in which the HUD projector generates an image. The section can, however, also be larger. The thickness of the intermediate layer can be variable in the entire vertical course, for example, can increase substantially steadily from the lower edge to the upper edge.

The wedge angle of the intermediate layer is preferably from 0.2 mrad to 1 mrad, particularly preferably from 0.3 mrad to 0.7 mrad, most particularly preferably from 0.4 mrad to 0.5 mrad. In this range, effective compensation of double images is achieved, in particular with typical angles of incidence of the HUD projector on the windshield, which are typically in the range from 50° to 70°, in particular 60° to 65° in motor vehicles.

The thickness of the intermediate layer can be constant in horizontal sections (in other words, sections roughly parallel to the upper edge and the lower edge). In that case, the thickness profile is constant over the width of the composite pane. However, the thickness can also be variable in horizontal sections. In that case, the thickness is variable not only in the vertical but also in the horizontal course.

The intermediate layer is formed by at least one thermoplastic film. The wedge angle can be created by suitable extrusion of the film or by stretching a film having constant thickness in the initial state. The intermediate layer can be formed by a single film or even by more than one film. In the latter case, at least one of the films must be implemented with the wedge angle. The intermediate layer can also be implemented as a so-called "acoustic film", which has a noise-attenuating effect. Such films typically consist of at least three layers, with the middle layer having higher plasticity or elasticity than the outer layers surrounding it, for example, as a result of higher plasticizer content.

The intermediate layer preferably has a minimum thickness from 0.4 mm to 1.5 mm, particularly preferably from 0.5 mm to 1.0 mm. The term "minimum thickness" refers to the thickness at the thinnest point of the intermediate layer, i.e., typically the thickness at the lower edge of the composite pane. Composite panes with thinner intermediate layers frequently have stability too low to be able to be used as a vehicle pane.

The intermediate layer preferably includes at least polyvinyl butyral (PVB), ethylene vinyl acetate (EVA), polyurethane (PU), or mixtures or copolymers or derivatives thereof, particularly preferably PVB. The intermediate layer is, in a preferred embodiment, formed from a PVB film.

The invention also includes methods for producing a composite pane for a head-up display having an upper edge and a lower edge, wherein (a) an inner pane having a thickness less than 1.6 mm is provided;
(b) one surface of the inner pane is provided with a transparent electrically conductive coating;
(c) a thermoplastic intermediate layer is provided, whose thickness is variable at least in sections in the course between two opposite edges;
(d) the intermediate layer is arranged between an outer pane and the inner pane, wherein the surface of the inner pane provided with the coating faces the intermediate layer and said edges of the intermediate layer are oriented pointing toward the upper edge and the lower edge, and wherein the total thickness of the composite pane is at least 4.0 mm; and
(e) the inner pane and the outer pane are joined together by lamination.

If the composite pane is to be curved, the outer pane and the inner pane are subjected to a bending process, preferably before lamination. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C.

The electrically conductive coating is preferably applied to the inner pane by physical vapor deposition (PVD), particularly preferably by cathodic sputtering ("sputtering"), most particularly preferably by magnetic field-enhanced cathodic sputtering.

The production of the composite glass is done by lamination with customary methods known per se to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

The invention also includes the use of a composite pane according to the invention in a motor vehicle, preferably a passenger car, as a windshield that serves as a projection surface of a head-up display.

In the following, the invention is explained in detail with reference to drawings and exemplary embodiments. The drawings are schematic representations and are not true to scale. The drawings in no way restrict the invention.

They depict.

Figure 1:
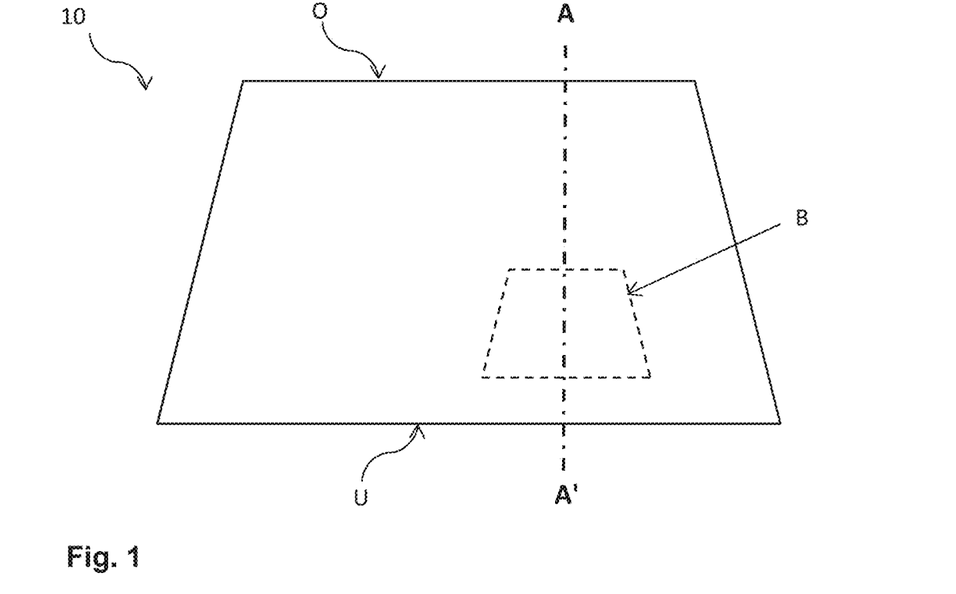
FIG. 1 a plan view of an embodiment of the composite pane according to the invention, FIG. 2 a cross-section through the composite pane of FIG. 1, FIG. 3 the composite pane of FIG. 2 as a component of a projection arrangement according to the invention, and FIG. 4 a flowchart of an embodiment of the method according to the invention.
Figure 2:
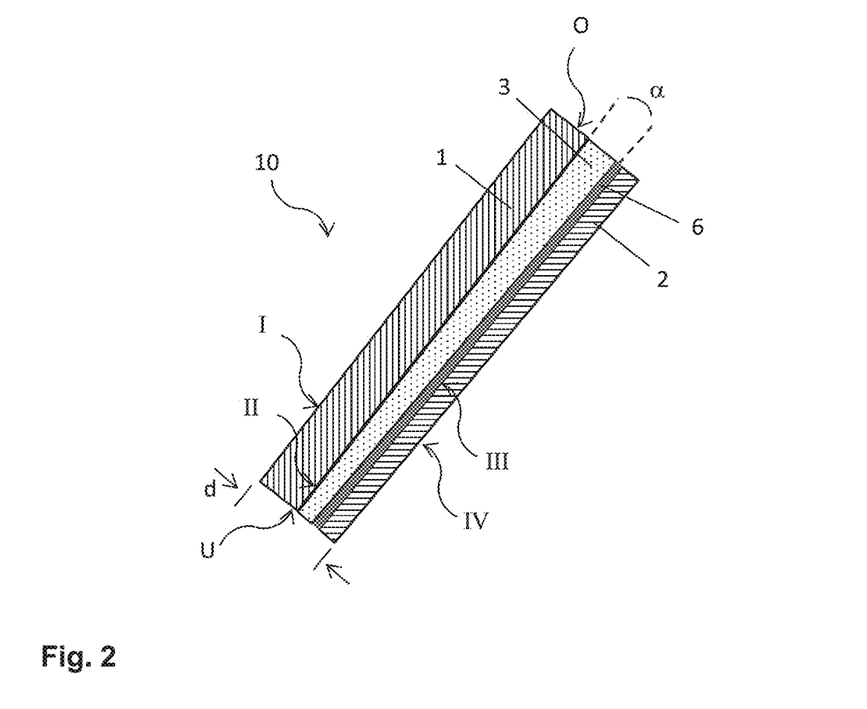

FIG. 1 and FIG. 2 depicts in each case a detail of a composite pane 10 according to the invention that comprises an outer pane 1 and an inner pane 2 that are joined to one another via a thermoplastic intermediate layer 3. The composite pane 10 is intended as a windshield of a motor vehicle that is equipped with a head-up display. In the installed position, the outer pane 1 faces the outside environment; the inner pane 2, the vehicle interior. In the installed position, the upper edge O of the composite pane 10 points upward to the vehicle roof (roof edge); the lower edge U, downward to the engine compartment (engine edge).

The outer pane 1 has an exterior-side surface I that faces the outside environment in the installed position and an interior-side surface II that faces the interior in the installed position. Likewise, the inner pane 2 has an exterior-side surface III that faces the outside environment in the installed position and an interior-side surface IV that faces the interior in the installed position. The interior-side surface II of the outer pane 1 is joined to the exterior-side surface III of the inner pane 2 via the intermediate layer 3.

A region B, corresponding to the HUD region of the composite pane 10, is also indicated in the figure. In this region, images are to be produced by a HUD projector. The primary reflection on the interior-side surface IV of the inner pane 2 produces the desired HUD display as a virtual image. The non-reflected radiation components penetrate through the composite pane 10 and are reflected again on the exterior-side surface I of the outer pane 1 (secondary reflection).

The thickness of the intermediate layer 3 increases steadily in the vertical course from the lower edge U to the upper edge O. For the sake of simplicity, the increase in thickness is shown as linear; however, it can also have more complex profiles. The intermediate layer 3 is formed from a single film of PVB (a so-called "wedge film" with variable thickness). The wedge angle α is approx. 0.5 mrad.

Due to the wedge-shaped implementation of the intermediate layer 3, the two virtual images that are produced by reflection of the projector image on the surface I and IV coincide. Consequently, the secondary reflection does not appear offset relative to the primary reflection such that bothersome ghost images can be avoided.

The composite pane 10 also has an electrically conductive coating 6 on the exterior-side surface III of the inner pane 2. The coating 6 is IR-reflecting and intended to reduce the heating of the vehicle interior by the IR component of sunlight. The coating 6 is, for example, a thin-film stack containing two or three layers made of silver and other dielectric layers.

The coating 6 represents a further reflecting boundary surface in the interior of the composite pane 10, on which the projector image is again reflected and thus results in an undesirable secondary image, the so-called "layer ghost image".

The inner pane 2 is made of soda lime glass and has, according to the invention, only a low thickness of, for example, 0.7 mm. This ensures that the spatial offset between the primary reflection and the layer ghost image is too small for the latter to have a bothersome effect on a viewer.

The outer pane 1 is also made of soda lime glass and has a significantly greater thickness of, for example, 3.0 mm. this ensures that the composite pane 10 has, overall, adequate mechanical stability, fracture resistance, and torsional stiffness and adequate acoustic properties to attenuate ambient noise to a extent acceptable for motor vehicles.

The minimum thickness of the intermediate layer 3 is, for example, 0.76 mm (measured at the lower edge U). Here, the intermediate layer 3 is formed by a single, wedge-shaped PVB film. However, a multilayer structure of the intermediate layer 3 is also conceivable, for example, a 0.36-mm-thick PVB film with a constant thickness, a 0.72-mm-thick PVB wedge film, and a 0.05-mm-thick PET film positioned therebetween.

The total thickness d of the composite pane 10 is, as a result, approx. 4.5 mm. The total thickness is measured at the thinnest side edge, namely the lower edge.

Figure 3:
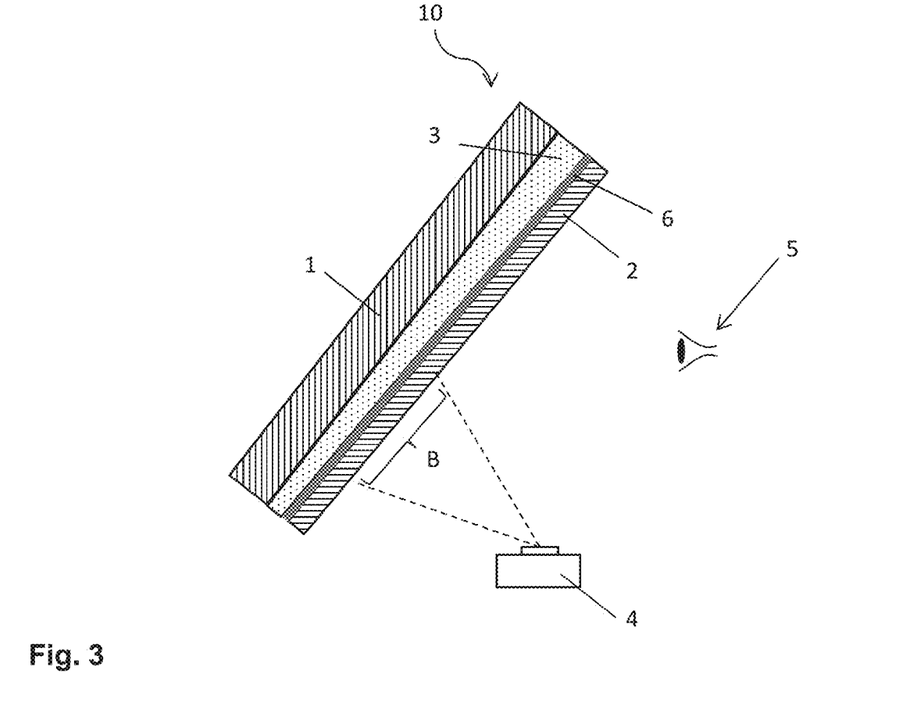

FIG. 3 depicts the composite pane 10 of FIGS. 1 and 2 as part of a projection arrangement for a HUD. The arrangement comprises, in addition to the composite pane 10, a projector 4, which is aimed at a region B. Images that are perceived by the viewer 5 (vehicle driver) as virtual images on the side of the composite pane 10 facing away from him can be produced in the region B (HUD region) by the projector. The wedge angle in the region B results in surfaces I, IV of the outer pane 1 and of the inner pane 2 that are inclined toward one another, by which means ghost images can be avoided. The thin inner pane results in coincidence of the layer ghost image caused by the electrically conductive coating 6 and the primary image, which are, consequently, no longer perceptible separate from one another.

Figure 4:
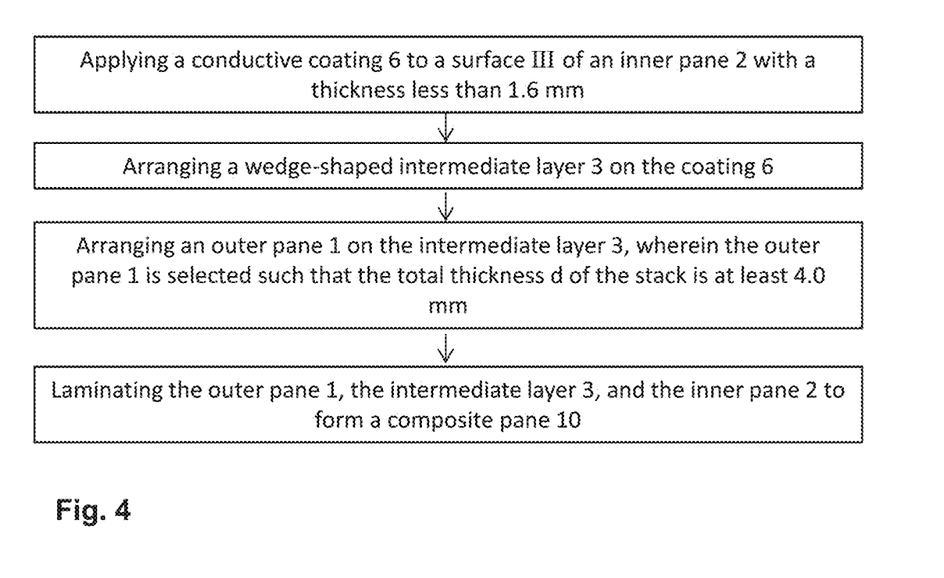

FIG. 4 depicts a flowchart of an exemplary embodiment of the method according to the invention for producing a composite pane 10 according to the invention.

EXAMPLES

Inner panes 2 of different thickness were provided with a conductive coating 6, illuminated at an angle of incidence of 60° by a HUD projector, and the offset between the primary image and the layer ghost image was determined at a typical eye position (eye position of the driver). The image distance of the HUD system was 2.3 m, as is typical for HUDs currently used. The results are summarized in Table 1.

TABLE 1

| | Thickness of inner pane 2/mm | | | | | |
|---|---|---|---|---|---|---|
| | 2.1 | 1.6 | 1.4 | 1.2 | 1.0 | 0.7 |
| Distance between primary reflection and layer ghost image/mm | 2.291 | 1.745 | 1.527 | 1.309 | 1.090 | 0.763 |

It can be seen that the offset becomes significantly smaller with decreasing thickness of the inner pane 2. The inventors found that with a thickness of less than 1.6 mm, the layer ghost image is hardly noticeable to a viewer. The occurrence of the layer ghost image can thus be effectively avoided by the design of the composite pane 10 according to the invention, which was unexpected and surprising for the person skilled in the art.

By means of a thicker outer pane 1, the low thickness of the inner pane 2 is compensated such that the total thickness d is in a range that is customary for motor vehicle panes, in particular windshields. This ensures adequate mechanical stability and adequate shielding capability against ambient noises.

LIST OF REFERENCE CHARACTERS (10) composite pane
(1) outer pane
(2) inner pane
(3) thermoplastic intermediate layer
(4) projector
(5) viewer/vehicle driver
(6) electrically conductive coating
(O) upper edge of the composite pane 10
(U) lower edge of the composite pane 10
(B) region of the composite pane 10/HUD region
(I) exterior-side surface of the outer pane 1, facing away from the intermediate layer 3
(II) interior-side surface of the outer pane 1, facing the intermediate layer 3
(III) exterior-side surface of the inner pane 2, facing the intermediate layer 3
(IV) interior-side surface of the inner pane 2, facing away from the intermediate layer 3
α wedge angle
d total thickness of the composite pane 10
A-A' section line

The invention claimed is:

1. A composite pane for a head-up display, comprising:
an upper edge;
a lower edge;
an outer pane;
an inner pane,
wherein the outer pane and the inner pane are joined to one another via a thermoplastic intermediate layer; and
a transparent, electrically conductive coating on the surface of the inner pane facing the intermediate layer,
wherein the thickness of the intermediate layer is variable at least in sections in the vertical course between the lower edge and the upper edge, and
wherein the inner pane has a thickness less than 1.6 mm, the outer pane has a thickness of 2.1 mm to 4.5 mm, and a total thickness of the composite pane is at least 4.4 mm.

2. The composite pane according to claim 1, wherein the composite pane is a vehicle windshield.

3. The composite pane according to claim 1, wherein the total thickness is from 4.4 mm to 6.0 mm.

4. The composite pane according to claim 1, wherein the total thickness is from 4.4 mm to 5.5 mm.

5. The composite pane according to claim 1, wherein the thickness of the inner pane is from 0.4 mm to 1.5 mm.

6. The composite pane according to claim 1, wherein the thickness of the inner pane is from 0.7 mm to 1.1 mm.

7. The composite pane according to claim 1, wherein the thickness of the outer pane is from 2.5 mm to 3.5 mm.

8. The composite pane according to claim 1, wherein the minimum thickness of the intermediate layer is from 0.4 mm to 1.5 mm.

9. The composite pane according to claim 1, wherein the minimum thickness of the intermediate layer is from 0.5 mm to 1.0 mm.

10. The composite pane according to claim 1, wherein the intermediate layer has a wedge angle from 0.2 mrad to 1 mrad.

11. The composite pane according to claim 1, wherein the intermediate layer has a wedge angle from 0.3 mrad to 0.7 mrad.

12. The composite pane according to claim 1, wherein the intermediate layer has a wedge angle from 0.4 mrad to 0.5 mrad.

13. The composite pane according to claim 1, wherein the outer pane and/or the inner pane are made of glass.

14. The composite pane according to claim 1, wherein the outer pane and/or the inner pane are made of soda lime glass.

15. The composite pane according to claim 1, wherein the outer pane and the inner pane are made of glass.

16. The composite pane according to claim 1, wherein the outer pane and the inner pane are made of soda lime glass.

17. The composite pane according to claim 1, wherein the intermediate layer contains at least polyvinyl butyral (PVB), ethylene vinyl acetate (EVA), polyurethane (PU), or mixtures or copolymers or derivatives thereof.

18. The composite pane according to claim 1, wherein the electrically conductive coating includes at least one electrically conductive layer, and wherein the at least one electrically conductive layer contains silver.

19. A projection arrangement for a head-up display, comprising:
a composite pane according to claim 1; and
a projector,
wherein the projector is aimed at a region of the composite pane, and
wherein the thickness of the intermediate layer is variable at least in the region of the composite pane.

20. A motor vehicle, comprising:
a windshield,
wherein the windshield comprises the composite pane according to claim 1, and
wherein the composite pane further comprises a projection surface for a head-up display.

21. The motor vehicle according to claim 20, wherein the motor vehicle is a passenger car.

22. A method for producing a composite pane for a head-up display having an upper edge and a lower edge, comprising:

providing an inner pane having a thickness less than 1.6 mm;

providing a surface of the inner pane with a transparent, electrically conductive coating;

providing a thermoplastic intermediate layer having a thickness, wherein the thickness is variable at least in sections in the course between two opposite edges;

arranging the thermoplastic intermediate layer between an outer pane and the inner pane, wherein the surface of the inner pane provided with the transparent, electrically conductive coating faces the intermediate layer and the thermoplastic intermediate layer are oriented in a direction from the lower edge to the upper edge, and wherein a total thickness of the composite pane is at least 4.0 mm; and joining together the inner pane and the outer pane by lamination.

23. The method for producing a composite pane according to claim 22, wherein the electrically conductive coating is applied by physical vapor deposition (PVD).

24. The method for producing a composite pane according to claim 22, wherein the electrically conductive coating is applied by cathodic sputtering.

25. The method for producing a composite pane according to claim 22, wherein the electrically conductive coating is applied by magnetic field-enhanced cathodic sputtering.

* * * * *